US008753468B2

(12) United States Patent
Caldwell et al.

(10) Patent No.: US 8,753,468 B2
(45) Date of Patent: Jun. 17, 2014

(54) METHOD FOR THE REDUCTION OF GRAPHENE FILM THICKNESS AND THE REMOVAL AND TRANSFER OF EPITAXIAL GRAPHENE FILMS FROM SIC SUBSTRATES

(75) Inventors: Joshua D. Caldwell, Accokeek, MD (US); Karl D. Hobart, Upper Marlboro, MD (US); Travis Anderson, Alexandria, VA (US); Francis J. Kub, Arnold, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 203 days.

(21) Appl. No.: 12/855,692

(22) Filed: Aug. 12, 2010

(65) Prior Publication Data
US 2011/0048625 A1 Mar. 3, 2011

Related U.S. Application Data

(60) Provisional application No. 61/237,342, filed on Aug. 27, 2009.

(51) Int. Cl.
*B44C 1/17* (2006.01)
*B44C 1/24* (2006.01)
*B32B 37/02* (2006.01)
*B32B 37/12* (2006.01)
*B32B 37/26* (2006.01)
*B32B 38/10* (2006.01)
*B44C 3/08* (2006.01)
*B29C 65/48* (2006.01)

(52) U.S. Cl.
USPC ............ 156/235; 156/249; 156/289; 977/887

(58) Field of Classification Search
CPC .... B32B 37/26; B32B 37/264; B32B 37/268; B32B 2307/748; B29C 33/58; B29C 33/68; B82Y 30/00; B82Y 40/00; C01B 31/0484; C01B 31/0438; C01B 31/043; B41M 5/42; B41M 7/0027; B41M 7/0054
USPC ......................................... 156/235, 249, 289
See application file for complete search history.

(56) References Cited

U.S. PATENT DOCUMENTS

| 4,824,498 | A | * | 4/1989 | Goodwin et al. ............... 156/71 |
| 7,358,152 | B2 | * | 4/2008 | Kub et al. ...................... 438/459 |
| 2007/0102111 | A1 | * | 5/2007 | Monsma et al. ............... 156/296 |
| 2009/0199960 | A1 | * | 8/2009 | Nuzzo et al. .................. 156/230 |
| 2009/0200707 | A1 | * | 8/2009 | Kivioja et al. ................ 264/293 |
| 2009/0235721 | A1 | * | 9/2009 | Robinson et al. ............ 73/31.05 |
| 2009/0291270 | A1 | * | 11/2009 | Zettl et al. .................. 428/195.1 |

\* cited by examiner

*Primary Examiner* — Sonya Mazumdar
(74) *Attorney, Agent, or Firm* — US Naval Research Laboratory; Rebecca L. Forman

(57) ABSTRACT

A method for reducing graphene film thickness on a donor substrate and transferring graphene films from a donor substrate to a handle substrate includes applying a bonding material to the graphene on the donor substrate, releasing the bonding material from the donor substrate thereby leaving graphene on the bonding material, applying the bonding material with graphene onto the handle substrate, and releasing the bonding material from the handle substrate thereby leaving the graphene on the handle substrate. The donor substrate may comprise SiC, metal foil or other graphene growth substrate, and the handle substrate may comprise a semiconductor or insulator crystal, semiconductor device, epitaxial layer, flexible substrate, metal film, or organic device.

6 Claims, 3 Drawing Sheets

METHOD FOR THE REDUCTION OF GRAPHENE FILM THICKNESS AND THE REMOVAL AND TRANSFER OF EPITAXIAL GRAPHENE FILMS FROM SIC SUBSTRATES

The present application is a non-provisional application that claims the benefit of provisional patent application Ser. No. 61/237,342 to Caldwell et al., filed Aug. 27, 2009 entitled "METHOD FOR THE REDUCTION OF GRAPHENE FILM THICKNESS AND THE REMOVAL AND TRANSFER OF EPITAXIAL GRAPHENE FILMS FROM SiC SUBSTRATES," the entire contents of which is incorporated herein by reference.

FIELD OF THE INVENTION

The present invention relates generally to graphene and polycrystalline diamond films and more specifically to the transfer of epitaxial graphene films from the SiC growth substrate onto arbitrary substrates.

BACKGROUND OF THE INVENTION

Graphene is the name denoted to a single sheet (1 atom thick) of $sp^2$-bonded carbon atoms. Effectively this is a single sheet of graphitic carbon. However, the term graphene has also come to be used to describe in a more general sense thin films (1-40 layers) of $sp^2$-bonded carbon under the auspices of discussions of single layer interactions and electrical behavior. Due to the difficulty in mass producing graphene films, it remains one of the most expensive materials known, with costs of over $1000 for a micron-sized sample as of April 2008. There are currently six known and reported methods for graphene film creation: mechanical exfoliation from graphite sources, such as natural, Kisch and highly-ordered pyrolytic graphite (HOPG), epitaxial growth on a graphene template, metal-catalyzed growth on copper and nickel foils, sodium reduction of ethanol, hydrazine reduction, and the sublimation of silicon from the surface of silicon carbide. Currently, the most widely used method is the exfoliation process from a Kisch or natural graphite substrate; however, reproducibility in the number of layers, uniformity in the layer thickness and layer widths make this method the least promising for mass production of graphene-based electronics. Epitaxial growth on SiC and metal-catalyzed graphene growth are currently the most promising techniques for large-scale graphene film creation. Large area sheets (>1 $cm^2$) have been created using chemical vapor deposition on both thin nickel and copper catalyst foils. Procedures for the transfer of these films in solution have been developed, however, the thickness of these films tends to be very large and the transfer process is destructive, requiring dissolving the metal catalyst for each sample created. Further, the carrier mobilities observed in these films tend to be reduced with respect to the values found in graphene films created by either epitaxial growth on SiC or via the mechanical exfoliation technique. Epitaxial growth graphene on SiC occurs via the sublimation of silicon from the surface of of either 6H-SiC or 4H-SiC substrates, epitaxial layers, or 3C-SiC epitaxial layers. This process involves heating the SiC substrate to temperatures in excess of 1100° C., typically between 1500-1600° C. As the silicon is sublimed from the surface, the residual carbon reconstructs, forming sp2 bonded layers stacked on top of one another. This process is capable of creating large-area graphene films, with the limitation derived simply by the size of the largest available SiC substrates (currently, substrates up to 4" in diameter are available commercially). The graphene layers are typically grown on low-offcut substrates. A hydrogen anneal of the SiC surface is often performed to smooth the SiC surface prior to the graphene film formation. There are two faces to the SiC substrate, a silicon- and a carbon-terminated surface. In the case of the former, thinner films (1-5 layers typically) are created, albeit with lower carrier mobilities and carrier densities. The growth of epitaxial graphene on the carbon face of SiC typically results in a larger number of monolayers, with as many as 30 or more graphene layers being grown. However, the carrier mobility is typically two to eight times higher in the graphene layers formed on the carbon face than on the silicon face. Due to the large number of layers on the carbon face, it can be difficult to modulate the conductivity of the carriers participating in the transport in the graphene layers through the use of field-effect gate modulation. An approach to reduce the number of graphene layers on the carbon face is therefore desirable.

There are a host of device applications for which graphene is highly desirable. Due to its two-dimensional structure, the electrical properties of the material are highly sensitive to modifications to its surface. Therefore, it is an ideal candidate for single molecule gas sensors. Because of the very high carrier mobility and low noise, graphene is desired as the channel material within field effect transistors, thereby enabling operation at very high frequencies. The high optical transparency of graphene also make it an ideal candidate for use as a transparent conducting electrode, which is required for optoelectronic devices where optical emission from underlying active regions would need a highly conductive, yet transparent contact to enable the emitted light to emit from the surface of the device. Currently, indium tin oxide is the material of choice for emitters in the visible region of the electromagnetic spectrum, but it is brittle, and therefore the high strength and flexibility of graphene would enable a host of other possible devices as well as provide significant benefit in current applications where indium tin oxide is used (lower sheet resistance, precise control of light transmission through varying thin film thickness, etc. . . . ). Finally, graphene has enabled devices such as a frequency multipliers, ultracapacitors, microelectromechanical systems (MEMS), and biocompatible sensors.

While the above devices and applications hold very high promise, all of the current processes for creating thin graphene layers lack the ability to create large-area graphene films of a few layers on a substrate amenable to cost-effective device fabrication and operation. Therefore, for all of these creation methods, a mechanism enabling the transfer of large areas of graphene to a substrate of interest is required.

Currently the only alternatives for transfer involve exfoliation or solution-based removal of the growth (donor) substrate followed by a subsequent transfer of the film in solution. In the case of the former, this involves the use of a non-releasable adhesive tape that is placed in contact with the graphene surface and is peeled away. There is no control over the graphene thickness or uniformity removed and the transfer procedure involves repeatedly placing the tape and graphene onto the desired substrate and peeling away, leaving graphene films with non-uniform thicknesses, morphologies, sizes and shapes. This process does not appear at present to be amenable to large scale graphene transfer, which is required for cost-effective mass production of graphene-based electronics and materials. Further, this process is not amenable to a single-flip process and therefore only the exposed graphene surface may be accessed. The second, solution-based process involves dissolving the donor substrate on which the graphene is grown, leaving the graphene film floating in the etchant solution. This film may then be transferred to a handle substrate of interest by placing the substrate within the solution and then pulling it through the floating graphene film. There are many difficulties with this transfer procedure. First, it is a destructive technique, involving the etching of the underlying substrate, which is costly. For epitaxial graphene grown on SiC this process is not possible, as SiC is not known to be readily soluble in any solution in its bulk form. Further this implies that the desired substrate for transfer and the solution used for etching of the initial substrate are compatible. Second, this process involves transferring of a graphene film in solution by floating the film on the solution surface and then pulling the handle substrate up through the solution, catching the graphene film on the substrate as it is removed from the solution. This process would presumably induce wrinkling, folding or tearing of the graphene films during the transfer process.

BRIEF SUMMARY OF THE INVENTION

The aforementioned problems are overcome in the present invention which provides a method for reducing the graphene film thickness on a donor substrate and/or transferring the graphene films from a donor substrate onto a handle substrate by applying a bonding material to the graphene on the donor substrate then releasing the bonding material and graphene from the donor substrate. This process leaves a thin graphene film on the donor substrate, while also removing the majority of the graphene layers on the bonding material. By applying the bonding material with the removed graphene onto the handle substrate, and releasing the adhesion strength of the bonding material, the graphene may be transferred onto the handle substrate. The donor substrate may comprise SiC, and the handle substrate may comprise any semiconductor or insulator crystal, polycrystalline material, metal surfaces, or flexible substrates such as organic transistors or LEDs.

The present invention enables the removal and transfer of graphene, graphane and/or graphene oxide films from one substrate to another. This enables the graphene to be removed from a donor substrate that is suitable for large size-scale production, such as SiC wafers or metal catalyst films/foils, and then subsequently transferred onto arbitrary handle substrates that are more desirable for device fabrication for reasons such as, but not limited to, cost efficiency, ease in device fabrication or for improved substrate attributes such as flexibility, optical transmission, thermal conductivity or improved electrical isolation from the substrate. This would also enable the transfer of graphene films to optoelectronic or electronic devices where the films may be used as a contact that is optically transparent and highly conductive or one that is electrically and thermally conductive.

The present invention also enables the creation of stacked layers of graphene films, with alternating intermediate layers. These intermediate films could be introduced to provide electrical isolation between stacked graphene layers, could be provided as mechanical hardeners, to lower strain between the substrate and the graphene films, or to introduce a dopant layer such as a delta doping layer that is typically used in quantum wells and heterostructures. In theory, these intermediary layers could be dielectrics, metal, glass, amorphous, metal oxide, oxide, nitride or polymer in nature to name a few. They could provide methods for creating as yet unrealized electronic and MEMS type-device structures.

Once transferred, the graphene films are amenable to a simple oxygen reduction process for etching, enabling easy fabrication of electronic or optoelectronic devices. Further, since the graphene films are typically inert in all but oxygen or hydrogen atmospheres, it is possible to chemically undercut material below the transferred graphene layers, or to transfer the films to a previously undercut substrate, thereby leaving behind suspended graphene films. This enables easier characterization of graphene layers by allowing the samples to be both free standing and transferred to substrates that are more amenable to the characterization method of interest.

These and other features and advantages of the invention, as well as the invention itself, will become better understood by reference to the following detailed description, appended claims, and accompanying drawings.

DETAILED DESCRIPTION OF THE INVENTION

Figure 1:
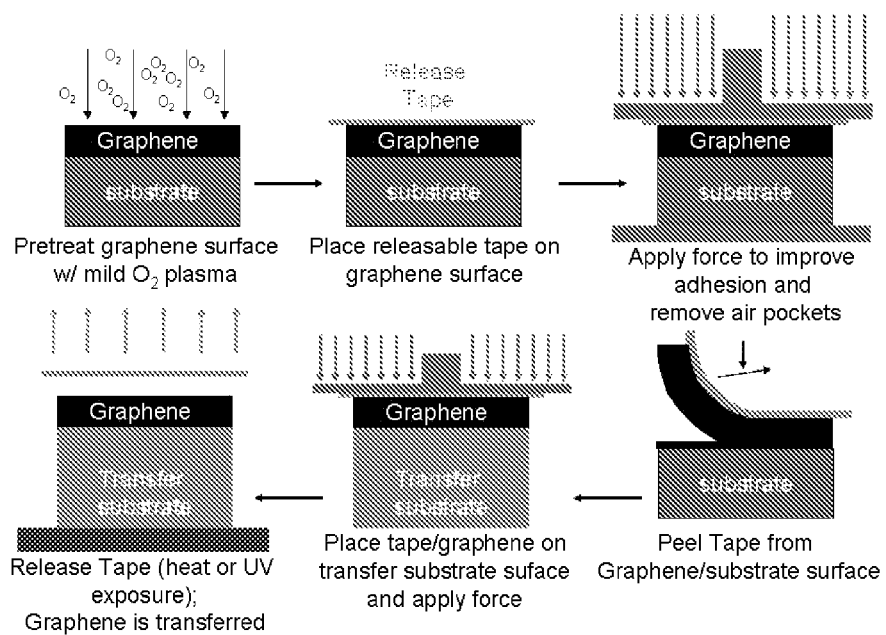
FIG. 1 is a schematic depicting the step-by-step double-flip transfer procedure used for the initial epitaxial graphene transfers. Variations on these steps are required depending on the donor and handle substrates used.

The present invention is directed towards a method enabling the transfer of large area graphene films from a donor substrate (e.g. SiC) to a handle substrate (e.g. silicon). The method involves three highly beneficial processes for the removal, reduction in layer thickness (number of graphene layers) and transfer of large areas of epitaxial graphene films from silicon carbide (SiC) substrates. Graphene is the name given to single sheets of graphitic carbon, which has been shown recently to possess electrical properties that are highly desirable, such as high carrier mobilities (1,000-200,000 $cm^2/Vs$), ballistic electron transport, and quantized optical transmission. There are primarily three methods for the creation of graphene-based devices (including both electronic, sensing, and MEMS devices). Graphene on SiC and metal-catalyzed graphene both offer the ability to create large-scale (>wafer scale) graphene films that may then be manipulated using the processes described here as required to meet device specifications.

The processes described herein enable the following as they pertain to epitaxial graphene deposited or grown on SiC: 1) the removal of epitaxial graphene layers from both silicon and carbon face of SiC thereby enabling 2) the transfer of the removed graphene layers to a handle substrate and 3) reducing the number of graphene layers remaining on the original SiC surface. In the case of the transferring capability, this enables transporting the graphene films onto substrates that are more amenable to device fabrication or for easier insertion into current electronic or MEMS systems. This latter fact leads to the favorability for transfer to silicon or silicon dioxide on silicon substrates or for forming suspended membranes of graphene layer(s). The properties of graphene are highly dependent upon the number of layers of graphene sheets. Therefore, the third enabling technology from this method, the capability to reduce the number of graphene layers on the SiC substrate would allow for the creation of thin graphene films (1-5 layers) from as-grown epitaxial graphene films that are otherwise very thick (tens of layers). This method for reduction, removal and transfer of graphene has been shown to be applicable to other graphene growth procedures such as exfoliation from highly-ordered pyrolytic graphene, and those grown on metal foils, such as copper or nickel, via the metal-catalyzed growth process. Further, this process should also be applicable to graphene oxide and graphane films as well.

One embodiment of the invention is a method for the dry removal of graphene from its native growth 'donor' substrate. The initial experimental results were completed on graphene films grown on the carbon-face of a 4H-SiC substrate; however, the removal procedure is applicable to most graphene films on any substrate created by most of the techniques described above. This method may also be used to reduce the number of graphene layers on the donor substrate surface. Further, the method may also be applicable to the transfer of graphene oxide or graphane films.

In this method, graphene can be transferred from the donor substrate (e.g. SiC) to a new 'handle' substrate either by (1) a single 'flip' process, in which case the graphene is coated with an material for bonding and then is bonded to the handle substrate, thereby leaving the graphene film, once transferred, inverted, or upside down with respect to its growth orientation; or (2) a double 'flip' process, where the graphene is transferred first to a temporary substrate or template (such as releasable tape) and then is transferred to a permanent, handle substrate, in which case the graphene film will have the original orientation of the graphene on the handle substrate once the transfer is complete. As the graphene layers near the interface between the graphene film and the donor substrate appear to be significantly different from the graphene layers that are exposed to the atmosphere (surface), this process would enable the ability to choose which graphene surface was exposed for device fabrication. Examples of materials that may be used as the bonding agent for the single flip process are benzocyclobutene (BCB), poly(methyl methacrylate) (PMMA), silicon dioxide, silicon nitride, or similar. For the double flip process, thermal- and UV-releasable tapes, water or solvent dissolvable adhesives (photoresist, water soluble tape, etc. . . . ), or an etch-back process using BCB, for instance, could be used.

In the case of the tape-based method, once uniform contact with the graphene surface is obtained, the tape may be peeled off, leaving behind a thin layer of graphene on the donor substrate (typically on the order of 1-5 layers), while removing the bulk of the graphene film with the tape. A pictorial schematic of this tape procedure is presented in FIG. 1. The process of obtaining uniform contact between the tape and the graphene surface may be obtained by providing a uniform force to the tape and graphene sample, by way of a wafer bonder, anvil, weight, or similar, with forces on the order of 1-10 N/mm$^2$ having been used thus far. This process may be repeated on the donor substrate in an effort to remove the remaining graphene layers as well. To improve adhesion between the tape and the graphene surface and/or to provide uniform contact to a non-uniform, flat surface, a thin spin-on film, such as PMMA may be deposited on the graphene surface and once hardened may serve as the surface for the tape to contact.

Figure 2:
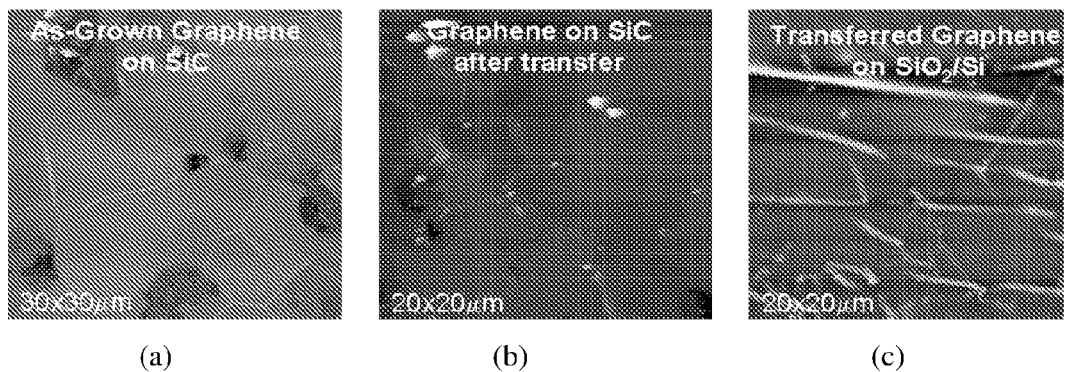
FIG. 2 is Atomic Force Microscope images of epitaxial graphene (a) prior to removal from the SiC donor substrate (as-grown), (b) following removal from the donor substrate (after transfer), and (c) transferred graphene on the $SiO_2$ on Si handle substrate.
Figure 3:
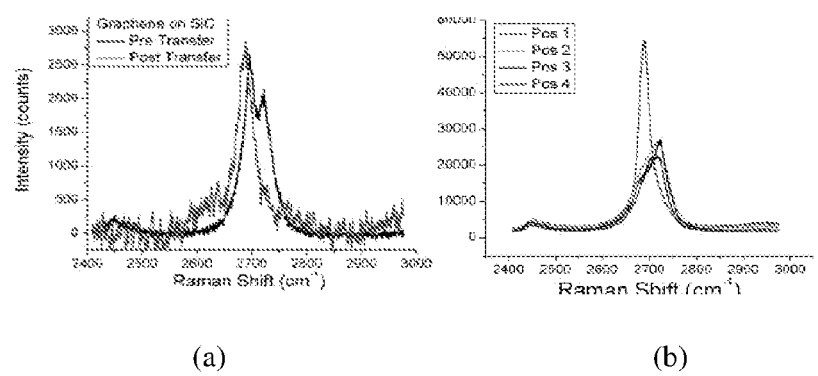
FIG. 3 is Raman scattering spectra collected from (a) epitaxial graphene prior to removal (pre transfer, black line) and post transfer (red line) and (b) a series of Raman scattering spectra collected from various positions across the transferred graphene on the handle $SiO_2$ on Si substrate.
Figure 4:
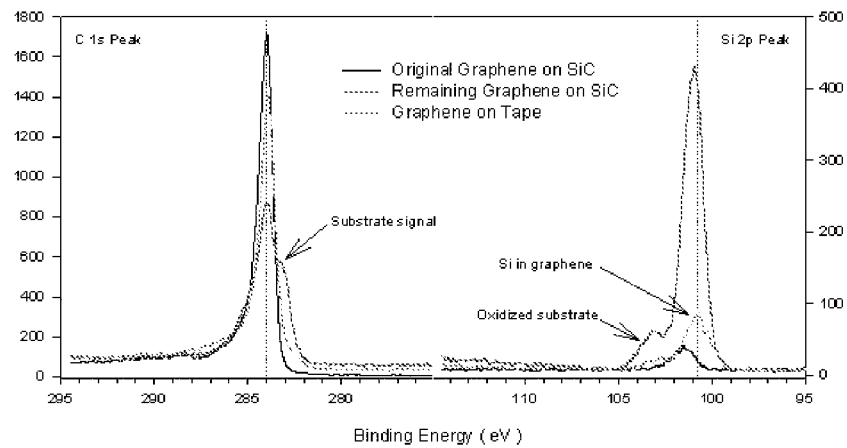
FIG. 4 is an X-ray photoemission spectra depicting the C 1s and Si 2p emission lines collected from epitaxial graphene prior to removal (original graphene on SiC, black line), following removal (remaining graphene on SiC, red line) and transferred graphene on the thermal release tape prior to transfer (green line).

Once the graphene has been removed, the tape with the now removed graphene film may be placed on the handle substrate. This handle substrate may be flexible, amorphous, polymer film, metal, crystalline, polycrystalline or non-crystalline. Specific substrates of interest include but are not limited to, Si, SiO$_2$ on Si, sapphire, diamond, organic LEDs, or substrates where graphene may serve as the top-side contact for a solid-state emitter or sensor. The surface of the handle substrate may need to be processed to improve the bond strength between the graphene and the substrate by either a chemical treatment or a plasma activation process prior to the bonding. Once the tape has been placed on the prepared handle substrate, a similar force may be applied to ensure uniform contact between the exposed graphene surface and the handle substrate is attained. Following this process, the tape/graphene/handle substrate stack should be exposed to either the agent to remove the adhesion strength of the transfer tape (high temperature or ultraviolet light for instance). The necessary release conditions may be obtained from the manufacturer of the specific tape used. To date, successful transfers have been accomplished using Nitto Denko Revalpha thermal release tapes of varying adhesion strengths and release temperatures. FIGS. 2, 3, and 4 show atomic force microscope images, Raman scattering spectra and x-ray photoelectron spectra from as-grown, transferred and residual graphene films following one such thermal-release tape transfer. These figures illustrate that the relatively thick (~30-40 layers) graphene film originally grown on the carbon-face SiC donor substrate was removed by the tape, with the exception of approximately 1-5 layers that remained behind on the SiC surface. Further, the results illustrate that the removed graphene, following the placement and pressing of the tape onto a SiO$_2$ surface and heating the stack above the release temperature for the thermal release tape used, was completely transferred onto the handle substrate. Typical solvent-based cleaning procedures removed the majority of tape residue left behind by the transfer process without any noticeable degradation to the transferred graphene films. An optional annealing procedure may also be used, either in atmosphere on a hot plate or within an annealing furnace, with temperatures of approximately 250° C. being used to improve the bond between the handle substrate and the transferred graphene film and remove any residual solvent. Once transferred, the graphene films may be used to create the desired devices or structures or may be prepared for lithographic processing. This process may be referred to as a double-flip process and enables the graphene to be transferred such that the initially exposed graphene surface is also the exposed surface on the handle substrate.

Figure 5:
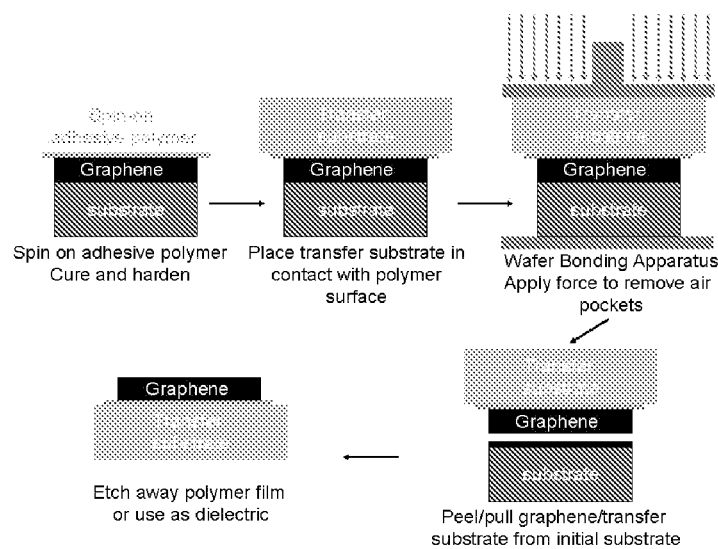
FIG. 5 is a schematic depicting the step-by-step single-flip transfer procedure used for the epitaxial graphene transfers utilizing BCB between the SiC donor and $SiO_2$ on Si handle substrates. Variations on these steps are required depending on the donor and handle substrates and adhesive film used.

For the adhesive film approach, BCB, PMMA, photoresist, silicon nitride, silicon dioxide, or similar films may be used to bond to the exposed graphene surface. These films may be spun or deposited onto the graphene surface. In the case of BCB, PMMA, photoresist or similar films, the handle substrate may be placed onto the exposed film surface and then an appropriate baking procedure, with the graphene/adhesive/substrate stack held under pressure, may be performed to cure and harden the bonding film. In the case of a single-flip process, this substrate would be the handle substrate. A schematic of this process is offered as FIG. 5. Once the donor substrate, graphene, adhesive and handle substrate stack are bonded together, the graphene may be removed from the donor substrate via a cleaving procedure. This adhesive film may then be removed via chemical etching procedures or used in a variety of roles, such as a gate dielectric. In the double-flip process, this new substrate serves as a temporary template and once removed, this stack would be placed with the now exposed graphene surface facing down, onto the desired handle substrate. Once in place, a similar force to those mentioned above could be used on this new stack, followed again by a cleaving procedure between the temporary substrate and the adhesive film. Again the adhesive could then be removed via standard chemical etching procedures. A successful transfer has been achieved using Dow Chemicals Cyclotene 3022-56 spun on both a graphene/SiC piece and a handle substrate. An EVG 501 series wafer bonder was used to heat the samples, which were placed face-to-face, and to apply pressure to enable the bonding of the stack. Infrared imaging was used to verify complete and void-free bonding was accomplished and then the BCB was cured completely on a hot plate. Once fully cured, the BCB-BCB bond strength is known to approach the fracture strength of Si, thus, the weakest interface is between the graphene and SiC (donor substrate). A razor blade or similar sharp edge is then inserted into this stack and causes the SiC wafer to shear, leaving a graphene-BCB-BCB-handle substrate stack. This process employs standard wafer bonding techniques and equipment, and therefore is easily scalable to the wafer scale.

In both of these processes, variations may be instituted that allow the graphene surface to be tailored for further device processing. Such processes could include, but are not limited to, oxide or gate dielectric deposition, metal contact deposition to either the graphene or oxide/dielectric for source drain contacts and/or gate contacts or embedded gate contacts and dielectrics. Such processes in the double flip procedure could enable patterned devices to be transferred to substrates that are not amenable to device fabrication. In the single flip process, these could enable embedded gate structures or multiple top and bottom double-gated devices. In both processes, the deposition of such a film might also enable more uniform surfaces for the graphene removal process. Further, this procedure could be repeated to enable stacking of graphene layers, with or without intermediate films to separate them. A successful transfer of a PECVD deposited $SiO_2$ layer on graphene film was completed using the double flip procedure outlined above with the thermal release tape.

In general, graphene, graphane and graphene oxide films can be transferred from the donor substrate onto a handle substrate as long as the interface strength between the graphene and the donor substrate is less than the interface bond strength between the graphene and the transfer adhesive following the release procedure.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," are not to be construed as limiting the element to the singular.

What is claimed as new and desired to be protected by Letters Patent of the United States is:

1. A method for using release tape to reduce graphene film thickness on a donor substrate and transfer graphene films from a donor substrate to a handle substrate, comprising:
    applying a release tape to an exposed graphene surface on the donor substrate;
    applying a uniform force to the release tape;
    releasing the release tape from the donor substrate thereby leaving graphene on the release tape;
    applying the release tape with graphene onto the handle substrate;
    applying a uniform force to the release tape; and
    releasing the release tape from the handle substrate to completely transfer the graphene from the release tape to the handle substrate thereby leaving an exposed graphene surface on the handle substrate in the same orientation as it was on the donor substrate wherein the exposed graphene surface on the handle substrate is the same exposed graphene surface that was on the donor substrate.

2. The method of claim 1, wherein the donor substrate comprises SiC metal foil or other graphene growth substrate, and the handle substrate comprises a semiconductor or insulator crystal, semiconductor device, epitaxial layer, flexible substrate, metal film, or organic device.

3. The method of claim 1, wherein the release tape is a thermal-releasable tape, a UV-releasable tape, a water soluble tape, or any combination thereof.

4. The method of claim 1, wherein after the graphene is transferred, the handle substrate is annealed to improve the bond between the handle substrate and the transferred graphene film.

5. The method of claim 1, wherein the steps are repeated to completely remove all of the graphene from the donor substrate.

6. The method of claim 1, wherein a film of poly(methyl methacrylate) (PMMA) or similar is used to improve the adhesion between the release tape and the graphene surface, to fill in variations in the graphene film thickness, or both.

* * * * *